G. H. GIBSON.
FLOW MEASURING APPARATUS.
APPLICATION FILED SEPT. 5, 1914.
1,152,310.
Patented Aug. 31, 1915.
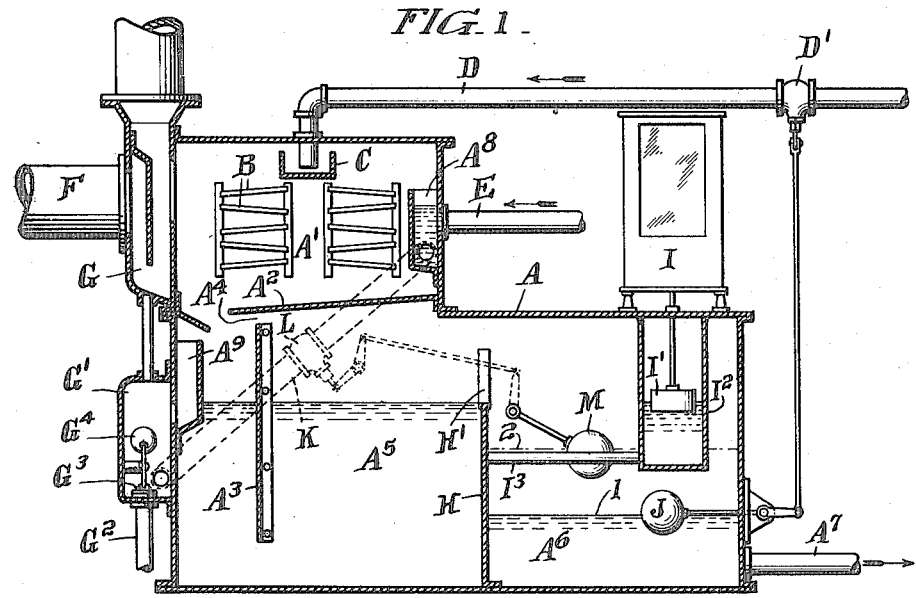
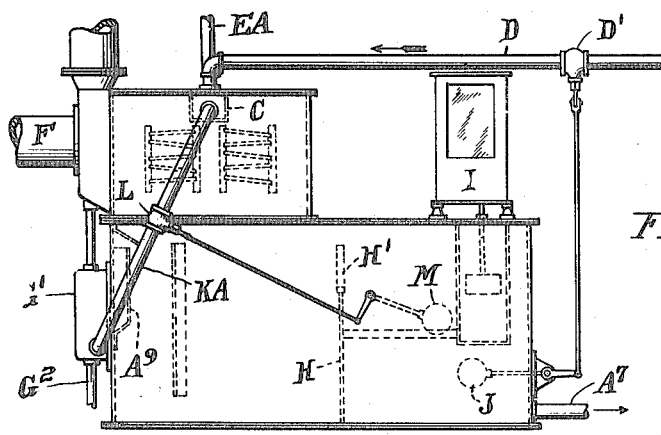
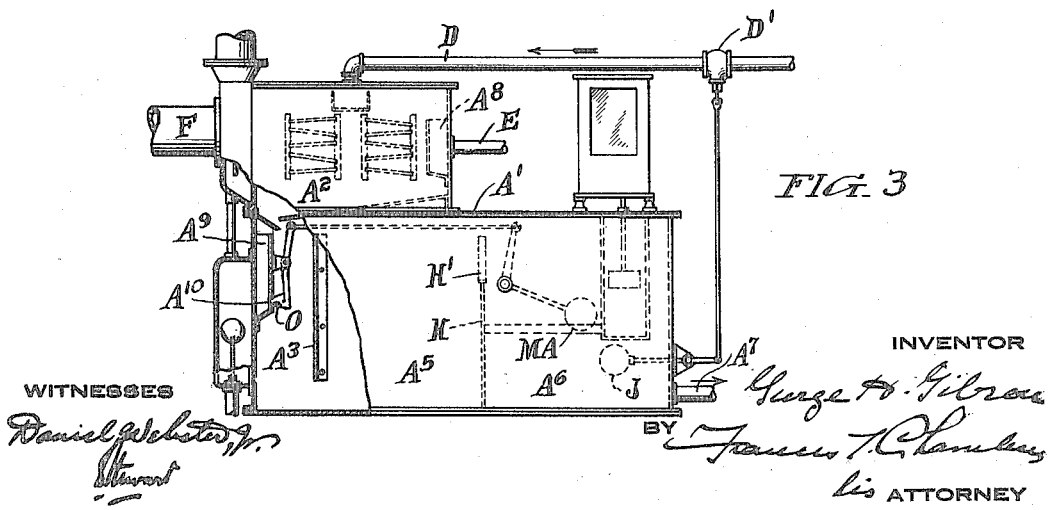
WITNESSES
INVENTOR
George H. Gibson
BY
his ATTORNEY

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, TRADING UNDER THE FIRM-NAME OF HARRISON SAFETY BOILER WORKS.

FLOW-MEASURING APPARATUS.

1,152,310.  Specification of Letters Patent.  Patented Aug. 31, 1915.

Application filed September 5, 1914. Serial No. 860,477.

*To all whom it may concern:*

Be it known that I, GEORGE H. GIBSON, a citizen of the United States of America, residing in Montclair, in the county of Essex and State of New Jersey, have invented certain new and useful Improvements in Flow-Measuring Apparatus, of which the following is a true and exact description, reference being had to the accompanying drawings, which form a part thereof.

My present invention relates to combined liquid heating and measuring apparatus of the type in which the water is heated in an open feed water heater and is measured by being passed from the heater through a weir measuring chamber.

The object of my invention is to provide simple and effective means for preventing the weir tank or chamber from being flooded, by the continued supply of water thereto at a time when the normal discharge from the weir tank is closed. This is objectionable, because it results in a false showing of the liquid passing through the tank, and is objectionable for other reasons. A difficulty of this sort has been heretofore experienced from the continued influx into the heater of water of condensation "returns" from heating coils in installations where these returns are not controlled, although the main supply of water to the heater is controlled by means responsive to the height of liquid level on the outlet side of the weir.

The characteristic feature of my invention is the provisions which I have made for diverting the water passing to the heater from the returns or otherwise in excess of the amount of water being withdrawn from the heater into the usual float trap provided with the heater to discharge the drip from the oil separator employed in steam supply connection to the heater.

The various features of novelty characterizing my invention are pointed out with particularity in the claims annexed to and forming a part of this specification. For a better understanding of the invention, however, and of the advantages possessed by it, reference should be had to the accompanying drawings and descriptive matter, in which I have illustrated and described the best forms of my invention now known to me.

Of the drawings: Figure 1 is a sectional elevation of a combined open feed water heater and weir meter embodying my present invention. Fig. 2 is an elevation of a modified form of apparatus; and Fig. 3 is an elevation, partially broken away and in section, of another modification.

In the drawings, and referring first to Fig. 1, A represents the tank inclosing the heating and measuring chambers of a combined open feed water heater and weir measuring device. In the heating chamber $A'$ are located the usual splash trays B, onto which the water to be heated overflows from the trough C. Water is passed into the trough C through the supply pipe D. The flow of water to the heater through the pipe D is regulated by the valve $D'$.

E represents a pipe for passing heater "returns" into a trough $A^8$ located within the heating chamber; the water entering the trough $A^8$ normally overflowing into the heating chamber proper and mixing at the lower end of the latter with the water falling off the splash trays B. The steam for heating the water admitted to the chamber $A'$ is supplied through the pipe F, which is connected to the heating chamber through the usual oil separator G.

$G'$ represents the usual float trap receiving the oil drip from the separator G, and discharging this drip into the waste pipe $G^2$ whenever the liquid level in the receiving chamber of the trap $G'$ rises high enough so that the float $G^4$ opens the valve $G^3$.

$A^9$ represents a channel through which water may pass from the tank A into the chamber $G'$ when the water level in the tank A is raised to "skim" off the impurities floating on the top surface of the water.

The heating chamber $A'$ is separated from the weir chamber by the partitions $A^2$ and $A^3$, which, as shown, are spaced apart to provide a pressure equalizing connection $A^4$ between the steam space of the heating chamber and the steam space of the weir chamber. The weir chamber is divided into an inlet compartment $A^5$, and an outlet compartment $A^6$, by the partition H, which is provided at its upper edge with the usual weir notch or notches $H'$. The valve $D'$ in the cold water supply pipe D is opened and closed as the water level in the outlet compartment $A^6$ falls below or rises to a normal working level, which may be that indicated by the line 1, by means of a float J.

$A^7$ represents the oultlet for measured water leading from the outlet compartment $A^6$ to a boiler feed pump or other means of or place for utilizing or disposing of the measured water passing through the apparatus.

I represents mechanism for indicating, integrating or recording the flow through the weir chamber, this mechanism being operated by a float I', which, as shown, works in a float chamber $I^2$ located within the compartment $A^6$, but connected by the pipe $I^3$ to the inlet compartment $A^5$, so that the height of liquid level in the float chamber $I^2$ is the same as in the compartment $A^5$.

In so far as above described, the apparatus shown in Fig. 1 is similar to that now in general use. With such apparatus the continued influx of water into the heater, through the "returns" pipe E, has sometimes resulted in flooding the weir chamber at times when no discharge through the normal outlet passage $A^7$ is permitted. This flooding of the weir chamber causes the measuring apparatus I to show a maximum or high rate of liquid flow at a time when no measured liquid is being withdrawn from the apparatus. Inasmuch as the flooded condition may prevail for several hours at a time, as where the discharge connection $A^7$ is closed for several hours each night, it is highly desirable to provide satisfactory means for obviating this false measurement of the rate of flow through the apparatus. This I accomplish with the apparatus shown in Fig. 1 by providing a by-pass pipe K leading from the bottom of the trough $A^8$ to the float chamber G'. A valve L in the pipe K is normally closed, but is opened to permit the "returns" to pass from the trough $A^8$ into the tank G' on a predetermined rise in the height of liquid level in the outlet compartment $A^6$ of the weir chamber. The operating means for the valve L comprises a float M, which opens and closes the valve L accordingly as the liquid level in the compartment $A^6$ rises to and falls below a predetermined height, which may be that indicated by the line 2.

The apparatus shown in Fig. 1 is intended for use where, as is frequently the case, the returns come back hot enough so that it is unnecessary to pass them over the splash trays B. Sometimes the returns come back at so low a temperature, that it is advisable to deliver them into the cold water trough C of the heater so that they will run over the trays B and be heated. In this case I may connect a by-pass pipe KA from the trough C to the float chamber G', as shown in Fig. 2. The valve L in the by-pass KA is controlled by a float M, as in Fig. 1. In Fig. 2, EA represents the connection for the returns or other auxiliary water supply; for instance, this may convey cold returns from a vacuum pump to the trough C. The arrangement shown in Fig. 2 possesses the advantage that it not only disposes of the water entering the apparatus through the auxiliary supply pipe EA when the valve D' is closed and no water is being withdrawn through the outlet $A^7$, but it also takes care of leakage which may occur from time to time through the valve D'.

In the arrangement shown in Fig. 3, a port $A^{10}$ is formed in the wall of the trough $A^9$ below the lowermost level of flow over the weir, and this port is controlled by the pivoted valve member O, which is connected to and operated by a float MA located in the outlet compartment of the weir chamber. The float MA moves the valve O to open and close the port $A^{10}$ on changes in water level in the compartment $A^6$, similar to those causing the float M to open and close the valve L in the constructions shown in Figs. 1 and 2. When the port $A^{10}$ is opened, the water level in the tank A at the supply side of the partition H is lowered to the level of the port $A^{10}$. With the apparatus shown in Fig. 3 it is obvious that there will be no danger of flooding the apparatus, either by water admitted through the returns connection E or through the pipe D, or by water formed in the heating chamber by condensation of the steam entering the latter through the pipe F.

When from time to time it becomes desirable to raise the water level in the tank to cause water to flow over the top of the trough A into the trap G' and skim off impurities, this may readily be accomplished by simply holding the valve D' open against the action of the float J with the construction shown in Fig. 1, and with the constructions shown in Figs. 2 and 3 by keeping the valves L or O closed while keeping the valve D' open.

While in accordance with the provisions of the statutes, I have illustrated and described the best forms of my invention now known to me, it will be apparent to those skilled in the art that changes may be made in the forms of apparatus described, without departing from the spirit of my invention, and that under some conditions certain features of my invention may be used without a corresponding use of other features.

Having now described my invention, what I claim as new and desire to secure by Letters Patent, is:

1. A combination open feed water heating and weir measuring apparatus, having a heating chamber, a steam supply connection thereto including an oil separator, a float trap for disposing of the drip from the separator, water supply means for supplying water to the heating chamber, a weir chamber divided into inlet and outlet compartments with a weir between them, said weir and heating chambers being connected and so relatively arranged that the normal path of water from said supply means is through the heating chamber into said inlet compartment and thence over said weir into said outlet compartment, and in combination therewith means responsive to the height of water level in said outlet compartment for diverting water passing to the heater away from said normal path and into said trap on a predetermined rise in said height of water level.

2. A combination open feed water heating and weir measuring apparatus having a heating chamber, a steam supply connection thereto including an oil separator, a float trap for disposing of the drip from the separator, means supplying water to the heater to be heated including a trough in the upper portion of the heater into which water is discharged and from which it normally overflows, a weir chamber divided into inlet and outlet compartments with a weir between them, said inlet compartment and heating chamber being connected and so relatively arranged that the water from the heating chamber normally passes into said inlet compartment and over said weir, and in combination therewith a drain pipe leading to said trap from said trough, and means responsive to the height of water level in said outlet compartment for opening and closing said pipe as said water level rises to and falls below a predetermined height.

GEORGE H. GIBSON.

Witnesses:
WM. B. CAMPBELL,
ROBERT G. CLIFTON.

Copies of this patent may be obtained for five cents each, by addressing the "Commissioner of Patents, Washington, D. C."